United States Patent
Sugimoto et al.

(10) Patent No.: US 6,593,960 B1
(45) Date of Patent: Jul. 15, 2003

(54) MULTI-FUNCTIONAL ON-VEHICLE CAMERA SYSTEM AND IMAGE DISPLAY METHOD FOR THE SAME

(75) Inventors: Mitsuyoshi Sugimoto, deceased, late of Yokohama (JP), by Kouko Sugimoto, legal representative, Yoshihiro Sugimoto, legal representative, Miki Sugimoto, legal representative; Satoru Masuda, Yokohama (JP); Yuichi Hirama, Yokohama (JP)

(73) Assignee: Matsushita Electric Industrial Co., Ltd. (JP)

( * ) Notice: Subject to any disclaimer, the term of this patent is extended or adjusted under 35 U.S.C. 154(b) by 371 days.

(21) Appl. No.: 09/635,659

(22) Filed: Aug. 10, 2000

(30) Foreign Application Priority Data

Aug. 18, 1999 (JP) .............................................. 11-231652

(51) Int. Cl.7 ................................................. H04N 7/18
(52) U.S. Cl. ....................................... 348/148; 348/142
(58) Field of Search ................................. 348/142–151

(56) References Cited

U.S. PATENT DOCUMENTS 5,289,321 A * 2/1994 Secor ........................... 359/896
6,175,300 B1 * 1/2001 Kendrick ...................... 340/436
6,222,447 B1 * 4/2001 Schofield et al. ............. 340/461
6,304,173 B2 * 10/2001 Pala et al. .................... 340/461
6,320,612 B1 * 11/2001 Young .......................... 348/148
6,357,883 B1 * 3/2002 Strumolo et al. ............ 359/857

FOREIGN PATENT DOCUMENTS

JP          7-215130          8/1995

* cited by examiner

Primary Examiner—Andy Rao
(74) Attorney, Agent, or Firm—Parkhurst & Wendel, L.L.P.

(57) ABSTRACT

A multi-functional on-vehicle camera system comprises a plurality of cameras mounted on a vehicle and monitors each displaying a camera image. An image processing section is provided for processing images taken by the plurality of cameras. A system control means is provided for selecting a camera image to be processed from a plurality of images obtained from the plurality of cameras based on signals representing vehicle conditions, and for designating a type of image processing performed in the image processing section. The image for assisting the safety driving is displayed at an appropriate timing according to driving conditions in such a manner that the driver can easily grasp the circumferential conditions from the displayed image.

28 Claims, 14 Drawing Sheets

MULTI-FUNCTIONAL ON-VEHICLE CAMERA SYSTEM AND IMAGE DISPLAY METHOD FOR THE SAME

BACKGROUND OF THE INVENTION

The present invention relates to a multi-functional on-vehicle camera system which comprises a plurality of monitoring cameras mounted on a vehicle and a display unit for displaying a monitored image. Furthermore, the present invention relates to an image display method for this multi-functional on-vehicle camera system. More specifically, the present invention provides a monitor image display letting a driver easily know circumferential conditions surrounding the vehicle. Moreover, the present invention displays such images at an appropriate timing according to driving conditions.

For the safety driving of automotive vehicles, a small camera is mounted on a vehicle and directed to a specific direction to take an image not directly viewed by a driver's eye. The taken image is displayed on a monitor in a passenger compartment of the vehicle. Furthermore, it is possible to take an image of white lines on a road and guide or control the vehicle based on the mutual position between the vehicle and the detected white lines.

Moreover, the published unexamined Japanese patent application No. 7-215130, as shown in FIG. 16, discloses a vehicle monitoring system comprising a plurality of cameras 1, 2, 3 and 4 mounted on a vehicle, a turning direction detecting section 5 for detecting a turning direction of the vehicle based on a winker signal, a steering direction detecting section 6 for detecting a steering direction of a steering wheel, an instruction input section 7 for allowing a driver to enter driver's instructions, a switching control section 8 for selecting an appropriate one of images taken by the plurality of cameras 1, 2, 3 and 4 based on information obtained from the associated sections 5, 6 and 7, and an image display section (i.e., monitor) 9 for displaying the image selected by the switching control section 8.

However, in ordinary driving conditions of an automotive vehicle, a driver often applies a brake or steers a steering wheel to avoid a possible accident based on a quick judgement on an image displayed on the monitor. Accordingly, it is necessary to provide an easy-to-grasp monitor display so as to prevent the driver from being puzzled or making an erroneous judgement. In this respect, the above-described conventional system should be more improved.

For example, the images taken by cameras mounted on a front side of a vehicle may be selectively displayed in accordance with a turning of the vehicle to the right or to the left. In such a case, it is important for the driver to promptly understand the displayed image without taking a time to judge whether this image is a right side view seen from the vehicle or a left side view seen from the vehicle. Such a prompt judgement is essentially important for a skillful driving operation.

For example, it may be desirable to display a word indicating the direction, e.g., "right" or "left", together with the displayed image. However, this forces the driver to carry out two thinking steps; i.e., one step of recognizing characters and another step of understanding the direction of the displayed image. A relatively long time is required for these steps. It may be unable to avoid an accident due to delay in grasping information obtained from the displayed image. Furthermore, the driver may not be able to quickly discriminate "right" from "left" or vice versa.

Furthermore, when the vehicle moves backward to a vacant space in a parking lot, the driver may rely on an image taken by a camera mounted on a rear side of the vehicle. However, the intended vacant space may not be clearly displayed on the monitor due to presence of another vehicles already in this parking lot. In such a case, the driver cannot rely on the displayed image and will hesitate in steering the vehicle to a target place while avoiding obstacles.

SUMMARY OF THE INVENTION

To solve the above-described conventional problems, the present invention has an object to provide a multi-functional on-vehicle camera system capable of displaying an image for assisting the safety driving at an appropriate timing according to driving conditions in such a manner that the driver can easily grasp the displayed image.

Furthermore, the present invention has an object to provide an image display method for such a multi-functional on-vehicle camera system.

In order to accomplish the above and other related objects, the present invention provides a multi-functional on-vehicle camera system comprising a plurality of cameras mounted on a vehicle and a display unit displaying at least one camera image, wherein image processing means is provided for processing images taken by the plurality of cameras, and system control means is provided for selecting at least one camera image to be processed in the image processing means from the images taken by the plurality of cameras based on vehicle conditions, and for controlling a type of image processing performed in the image processing means.

According to a preferred embodiment of the present invention, the multi-functional on-vehicle camera system further comprises graphic superimposing means for superimposing a graphic pattern on the image processed by the image processing means. The system control means controls both a type and a position of the graphic pattern superimposed by the graphic superimposing means.

According to the preferred embodiment of the present invention, it is preferable that the plurality of cameras include at least two cameras selected from the group consisting of a rear camera taking a rear view seen from the vehicle, right and left pillar cameras taking right and left rear side views seen from the vehicle, right and left door mirror cameras taking right and left door mirror views seen from the vehicle via right and left door mirrors, right and left lateral cameras taking front side views seen from the vehicle, and a front camera taking a front view seen from the vehicle.

According to the preferred embodiment of the present invention, it is preferable that the display unit includes a right monitor displaying an image taken by a right door mirror camera, and a left monitor displaying an image taken by a left door mirror camera.

According to the preferred embodiment of the present invention, it is preferable that the image processing means produces a plan view image based on images of a plurality of cameras so that the plan view image includes an image of the vehicle seen from above.

According to the preferred embodiment of the present invention, it is preferable that the image processing means produces a panorama image based on images of a plurality of cameras.

According to the preferred embodiment of the present invention, it is preferable that the image processing means produces a joint image by combining images of a plurality of cameras.

According to the preferred embodiment of the present invention, it is preferable that the image processing means produces a surrounding image representing a surrounding view seen from the vehicle by successively connecting images of all of the plurality of cameras mounted on the vehicle.

According to the preferred embodiment of the present invention, it is preferable that the image processing means produces an image formed by using part of image data obtained from the plurality of cameras.

According to the preferred embodiment of the present invention, it is preferable that the image processing means produces an image including a moving object approaching or leaving with respect to the vehicle so that the moving object is emphasizing by a different color.

According to the preferred embodiment of the present invention, it is preferable that the system control means designates the camera image to be used in the image processing and designates the type of image processing performed in the image processing means based on at least one signal representing vehicle conditions selected from the group consisting of a steering angle signal, a vehicle speed signal, gear position information and winker information.

According to the preferred embodiment of the present invention, it is preferable that the graphic superimposing means superimposes a graphic pattern of a moving object approaching or leaving with respect to the vehicle.

Furthermore, the present invention provides an image display method for a multi-functional on-vehicle camera system comprising a plurality of cameras mounted on a vehicle and a display unit displaying at least one camera image, the image display method comprising a step of processing at least one camera image selected from the a plurality of images obtained from the plurality of cameras based on vehicle conditions, and a step of displaying a processed camera image on the display unit.

According to the preferred embodiment of the present invention, it is preferable that the plurality of cameras include at least two cameras selected from the group consisting of the rear camera, the right and left pillar cameras, the right and left door mirror cameras, the right and left lateral cameras, and the front camera. And, the images of at least two cameras are processed in the image processing means and displayed on the display unit.

According to the preferred embodiment of the present invention, it is preferable that a plan view image is produced and displayed based on at least three images of the rear camera and the right and left pillar cameras when the vehicle moves backward for parking.

According to the preferred embodiment of the present invention, it is preferable that a plan view image is produced and displayed based on at least three images of the rear camera, the left pillar camera and the left door mirror camera when the vehicle moves backward for parking along a left side of a road.

According to the preferred embodiment of the present invention, it is preferable that a plan view image is produced and displayed based on at least three images of the rear camera, the right pillar camera and the right door mirror camera when the vehicle moves backward for parking along a right side of a road.

According to the preferred embodiment of the present invention, it is preferable that a panorama image is produced and displayed by combining at least two images of the left door camera and the left pillar camera when the vehicle turns left, thereby eliminating an accident occurring at an inside of the vehicle during a left turning or cornering operation.

According to the preferred embodiment of the present invention, it is preferable that a panorama image is produced and displayed by combining at least two images of the right door camera and the right pillar camera when the vehicle turns right, thereby eliminating an accident occurring at an inside of the vehicle during a right turning or cornering operation.

According to the preferred embodiment of the present invention, it is preferable that a panorama image is produced and displayed by combining at least two images of the left pillar camera and the rear camera when the vehicle performs lane changing to a left lane.

According to the preferred embodiment of the present invention, it is preferable that a panorama image is produced and displayed by combining at least two images of the right pillar camera and the rear camera when the vehicle performs lane changing to a right lane.

According to the preferred embodiment of the present invention, it is preferable that the display unit includes a right monitor displaying an image taken by the right door mirror camera and a left monitor displaying an image taken by the left door mirror camera.

According to the preferred embodiment of the present invention, it is preferable that each of the right and left monitors displays a limited image seen within a view angle of a corresponding door mirror when the vehicle is traveling.

According to the preferred embodiment of the present invention, it is preferable that a panorama image is produced and displayed by combining three images of the right and left pillar cameras and the rear camera when the vehicle is traveling ordinarily.

According to the preferred embodiment of the present invention, it is preferable that a joint image is produced and displayed by combining two images of the right and left lateral cameras when the vehicle is traveling slowly or stopped for confirmation of forward or side obstacles.

According to the preferred embodiment of the present invention, it is preferable that the image of the right lateral camera is enlarged when the vehicle turns right, and the image of the left lateral camera is enlarged when the vehicle turns left.

According to the preferred embodiment of the present invention, it is preferable that the image displayed on the display unit includes a moving object approaching or leaving with respect to the vehicle, and the object is emphasizing by a different color.

According to the preferred embodiment of the present invention, it is preferable that a graphic pattern is superimposed on the displayed image so that the graphic pattern represents a moving object approaching or leaving with respect to the vehicle.

According to the preferred embodiment of the present invention, it is preferable that the image taken by the door mirror camera is continuously displayed when any passenger is in the vehicle.

With the characteristic features of the present invention, it becomes possible to display an image for assisting the safety driving at an appropriate timing according to driving conditions in such a manner that the driver can easily grasp the displayed image.

BRIEF DESCRIPTION OF THE DRAWINGS

The above and other objects, features and advantages of the present invention will become more apparent from the following detailed description which is to be read in conjunction with the accompanying drawings, in which.

DESCRIPTION OF THE PREFERRED EMBODIMENT

Figure 1:
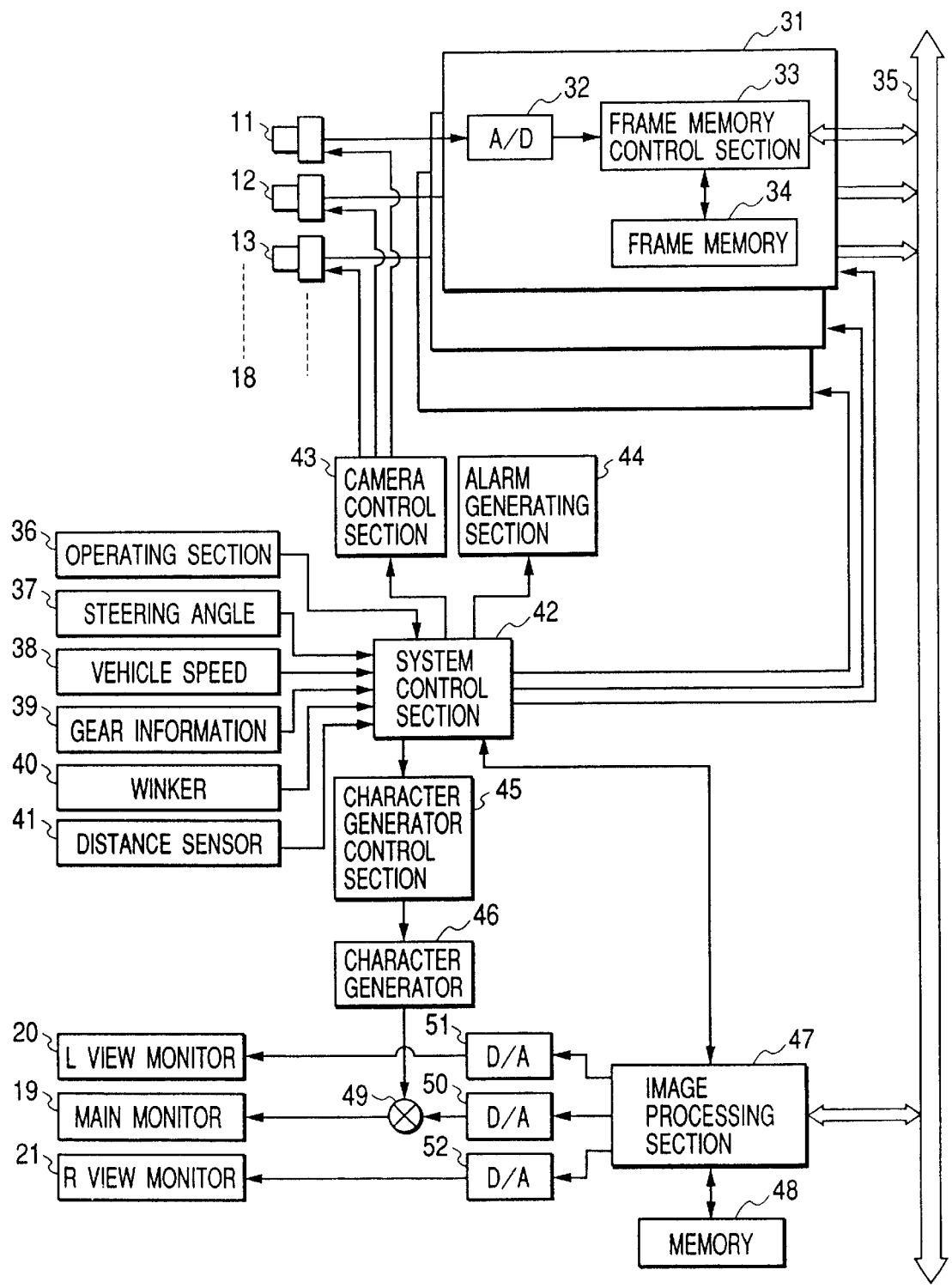
FIG. 1 is a block diagram showing a multi-functional on-vehicle camera system in accordance with a preferred embodiment of the present invention.

Hereinafter, a preferred embodiment of the present invention will be explained with reference to the attached drawings. Identical parts are denoted by the same reference numerals throughout the views.

Figure 3:
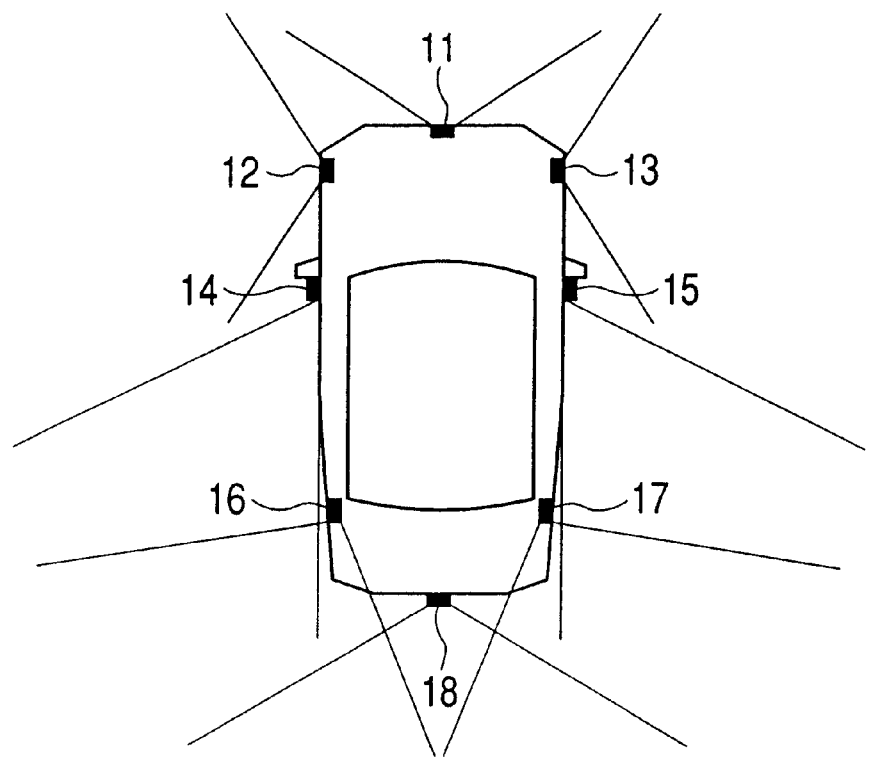
FIG. 3 is a plan view showing a plurality of cameras mounted on the system vehicle in accordance with the preferred embodiment of the present invention.

As shown in FIG. 3, the multi-functional on-vehicle camera system in accordance with a preferred embodiment of the present invention comprises a total of eight cameras mounted circumferentially on a vehicle. A front camera 11, located at a front center of the vehicle, takes an image of a front view seen from the vehicle. A left lateral camera 12, located at a front left corner of the vehicle, takes a front left side view seen from the vehicle. A right lateral camera 13, located at a front right corner of the vehicle, takes a front right side view seen from the vehicle. A left door mirror camera 14, located on or in the vicinity of a left door mirror, takes a left door mirror view seen from the vehicle via a left door mirror. A right door mirror camera 15, located on or in the vicinity of a right door mirror, takes a right door mirror view seen from the vehicle via a right door mirror. A left pillar camera 16, located on or in the vicinity of a left rear pillar, takes a left rear side view seen from the vehicle. A right pillar camera 17, located on or in the vicinity of a right rear pillar, takes a right rear side view seen from the vehicle. A rear camera 18, located at a rear center of the vehicle, takes a rear view seen from the vehicle.

Figure 4:
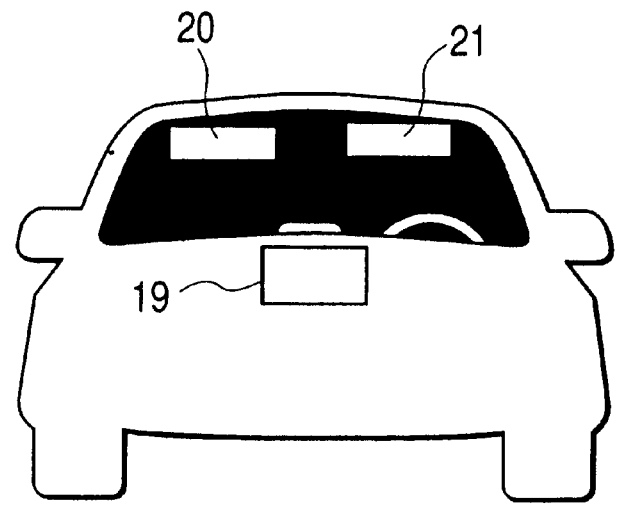
FIG. 4 is a front view showing a plurality of monitors installed in the system vehicle in accordance with the preferred embodiment of the present invention.

FIG. 4 shows a total of three monitors installed in a passenger compartment of the vehicle. A main monitor 19 is embedded in a dash board. A left view monitor 20 and a right view monitor 21 are installed near the upper end of a front windshield glass. The main monitor 19 has a screen size larger than those of the left and right view monitors 20 and 21.

FIG. 1 is a block diagram showing a schematic arrangement of a vehicle incorporating the multi-functional on-vehicle camera system of the present invention. Each of the above-described cameras 11 to 18 mounted on the vehicle is constituted by a solid image pickup element, such as CCD or CMOS image pickup element. An image data transmitting section 31, associated with a corresponding camera, converts a video signal of this camera into image data and transmits the converted image data via a vide bus 35. An image processing section 47 receives the image data transmitted via the video bus 35 to analyze the image data and perform editing and composing processing. A memory 48 is used as a work area for the image processing. A plurality of D/A converting sections 50–52 convert the processed image data into an analog signal. A character generator 46 produces a graphic pattern displayed in accordance with a code. A character generator control section 45 controls the graphic pattern produced from the character generator 46. A mixer 49 mixes the graphic pattern produced from the character generator 46 with the image produced from the D/A converter 50. The main monitor 19, the left view monitor 20, and the right view monitor 21 display the image. A camera control section 43 controls the direction/angle of each of the cameras 11–18 as well as image pickup conditions. An alarm generating section 44 raises the alarm. A system control section 42 controls various sections based on driver's instructions entered from an operating section 36, a steering angle signal 37, a vehicle speed signal 38, gear position information 39, a winker signal 40 and a supersonic distance sensor 41.

Furthermore, each image data transmitting section 31 comprises an A/D converting section 32 converting the video signal of each camera into a digital signal, a frame memory 34 storing image data, and a frame memory control section 33 controlling storage and transmission of the image data.

The cameras 11–18 produce various video signals in conformity with NTSC standards, PAL standards etc. Or, the camera output signals may meet the VGA standards. The video signals for each standard include R, G and B outputs, Y, U and V outputs, a composite output, as well as digital outputs. The digital outputs require no A/D and D/A converters.

The system control section 42 inputs various sensing signals; e.g., the steering angle signal 37 representing a steering angle of a steering wheel, the vehicle speed signal 38 representing a rotational speed of a wheel, the gear position information 39 representing a gear position in a power train mechanism of the vehicle, the winker signal 40 responsive to a right or left turning lever, and the supersonic distance sensor 41 located at a front or rear side of the vehicle to detect a distance from this vehicle to a neighboring vehicle or obstacle.

The system control section 42 controls each image data transmitting section 31 based on the obtained information as well as the driver's instructions entered from the operating section 36. The system control section 42 sends selected image data obtained from the cameras 11–18 to the image processing section 47. Furthermore, the system control section 42 controls the way of processing images in the image processing section 47. To this end, the system control section 42 controls the camera control section 43 to adjust the direction/angle of each camera, thereby obtaining necessary image data.

The image processing section 47 analyzes the received image data, edits the image data, and composes the images based on instructions sent from the system control section 42. Furthermore, the image processing section 47 sends required analysis result to the system control section 42. The system control section 42 activates the alarm generating section 44 and controls the character generator control section 45 if necessary based on the obtained analysis result.

The character generator control section 45, when it receives an instruction from the system control section 42, causes the character generator 46 to output a graphic pattern to be superimposed on the image processed by the image processing section 47.

To assist the safety driving, the monitors 19 to 21 display the images at an appropriate timing according to driving conditions in such a manner that the driver can easily grasp the displayed image.

Hereinafter, the image processing performed chiefly in the image processing section 47 will be explained in greater detail.

Plan View Image

The plan view image, i.e., an image of the vehicle and surroundings seen from above, is obtained by analyzing and composing the plurality of images obtained from the cameras mounted on the vehicle. For example, when the vehicle moves backward for parking, the main monitor 19 displays the plan view image of a parking lot seen from above. Thus, the driver can clearly recognize a vacant space in the parking lot based on the image displayed on the main monitor 19. A non-published Japanese patent application No. 11-109946 discloses details about the method for creating the plan view image.

Figure 5:
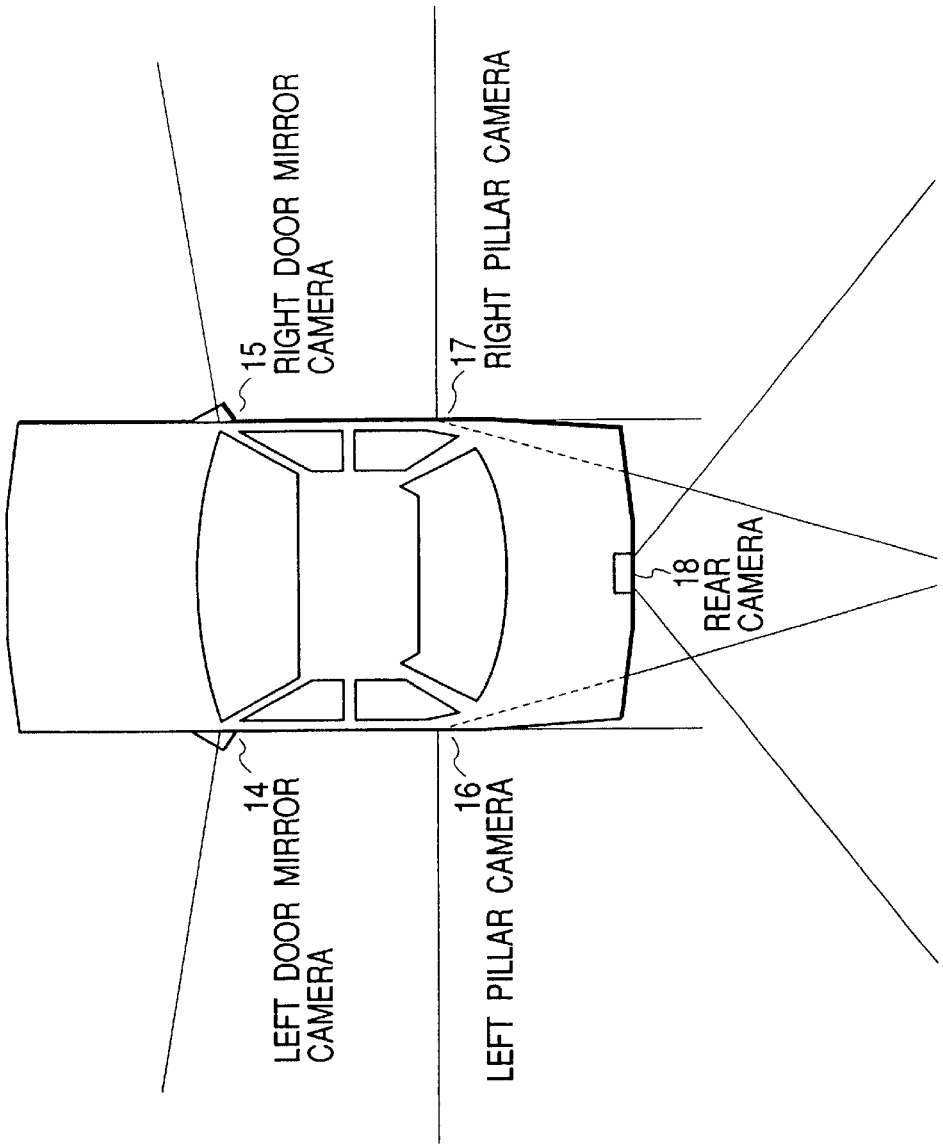
FIG. 5 is a plan view showing layout of a plurality of cameras used for forming a plan view image in accordance with the preferred embodiment of the present invention.
Figure 6:
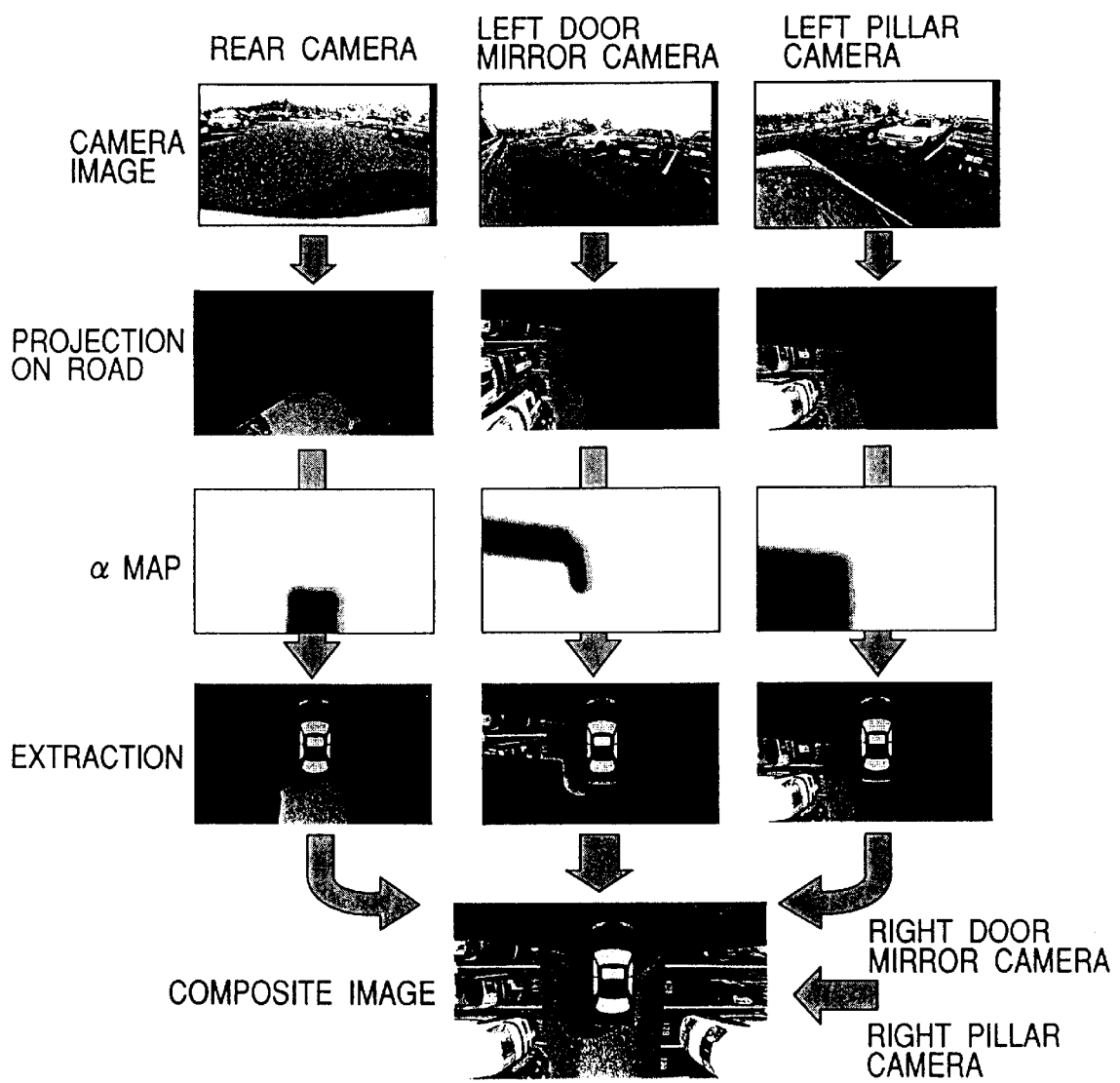
FIG. 6 is a view showing the procedure for forming the plan view image in accordance with the preferred embodiment of the present invention.

FIG. 6 shows the procedure of forming the plan view image by using the images obtained from the door mirror cameras 14 and 15, the pillar cameras 16 and 17, and the rear camera 18 shown in FIG. 5. According to FIG. 6, the left side and the central portion of a composite image is formed based on the images obtained from the left door mirror camera 14, the left pillar camera 16, and the rear camera 18.

First, the images obtained from the left door mirror camera 14, the left pillar camera 16, and the rear camera 18 are converted into projective images projected on the road. To this end, a road area is determined so as to correspond to the field of view of each camera shown in FIG. 5. The image taken by each camera is converted into the projected-on-road image through coordinate conversion. Each projected-on-road image thus obtained is weighted in accordance with an α map which indicates an area necessary for forming the plan view image. The weighted images are then combined to form a composite image.

The images of the right door mirror camera 15 and the right pillar camera 17 are processed in the same manner. Thus, all of the weighted images being weighted by α maps are combined to form a composite image. A graphic image representing an automotive vehicle is disposed on a vehicle position in the obtained composite image. The memory 48 stores the graphic image representing an automotive vehicle.

In this manner, the plan view image is created. The obtained plan view image includes the system vehicle and surroundings.

The above-described plan view image emphasizes the rear side of the system vehicle based on the images of the door mirror cameras 14 and 15, the pillar cameras 16 and 17 and the rear camera 18. It is however possible to obtain a plan view image emphasizing the left side and the left rear side of the system vehicle based on the images of the left lateral camera 12, the left door mirror camera 14, the left pillar camera 16, and the rear camera 18. Similarly, it is possible to obtain a plan view image emphasizing the right side and the right rear side of the system vehicle from the images of the right lateral camera 13, the right door mirror camera 15, the right pillar camera 17, and the rear camera 18. These two plan image views serve as useful image information for assisting the driver when parking along left and right sides of a road.

The number of cameras used for forming the plan view image may be two or less.

Panorama Image

The panorama image is a super wide image obtained by combining a plurality of images taken by the cameras mounted on the vehicle. More specifically, the panorama image has a view angle of approximately 160–170° whereas an ordinary wide image has a view angle of approximately 120°.

Figure 8:
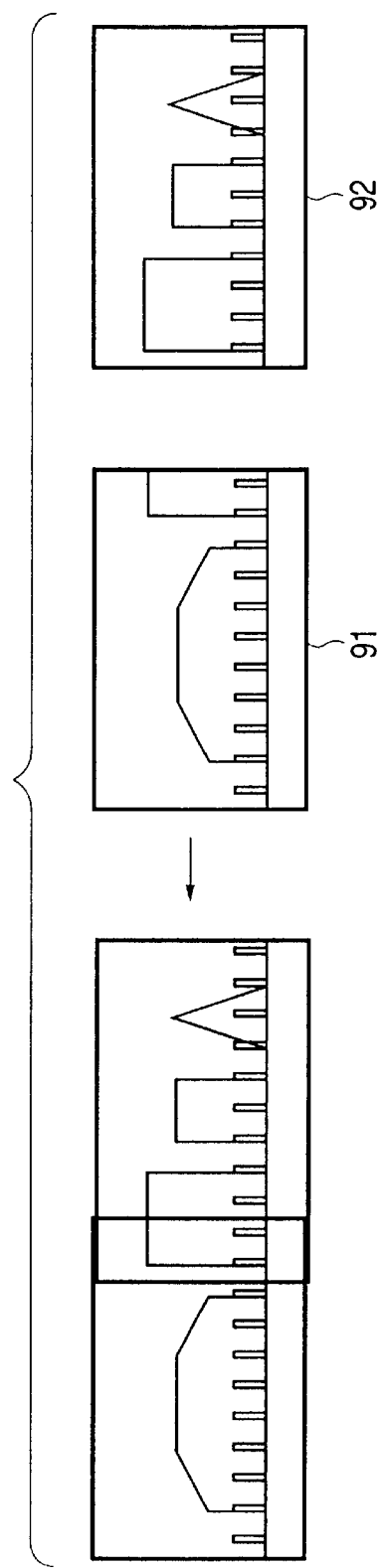
FIG. 8 is a view showing a panorama image formed in accordance with the preferred embodiment of the present invention.

FIG. 8 shows a method of forming the panorama image. For example, an image 91 of the right door mirror camera 15 and an image 92 of the right pillar camera 17 are analyzed to detect image elements commonly involved in the analyzed images 91 and 92. Then, a panorama image is composed by overlapping the common elements involved in both images 91 and 92. When the resultant panorama image is displayed on the main monitor 19, the driver can grasp a wide range of circumferential conditions around the vehicle at a glance. The panorama image is advantageous compared with the normal images having more narrower view angles in that the driver can immediately understand the relationship between the actual position and the displayed image. Hence, in a urgent situation where the driver's prompt operation based on the displayed image is required, the panorama image makes it possible for the driver to perform the vehicle driving operation properly without any hesitation.

In the formation of the panorama image, it is necessary to adjust the direction/angle of each camera so that two cameras are in a partly overlapped relationship in their fields of view while providing a sufficiently wide view angle when their fields of view are integrated. Accordingly, when the panorama image is displayed, the system control section 42 instructs the camera control section 43 to perform the direction/angle adjustment for respective cameras 11–18.

Furthermore, it is possible to combine three or more camera images to produce a panorama image.

Surrounding Image

The surrounding image is formed by successively connecting all the images taken by the cameras 11–18 based on a driver's instruction of the operating section 36. Thus, the surrounding image is an image continuously displaying surroundings or circumstances around the vehicle. The operating section 36 is a joystick type which allows the driver to instruct a preferable direction. When the driver instructs any preferable direction, the system control section 42 causes the image data transmitting sections 31 of appropriate neighboring cameras, e.g., camera 11 and camera 12, located in the driver's instructing direction to output images. The image processing section 47 connects the output images by overlapping the same image elements as performed in the formation of the panorama image. When the driver's instructing direction is changed continuously in the clockwise direction, the images of the cameras 12 and 14 are connected and then the images of the cameras 14 and 16 are connected. In this manner, neighboring images are successively connected one by one. The image processing is performed in such a manner that the displayed images are continuously scrolled in one direction on the monitor screen. Accordingly, when the driver's instruction for the surrounding display is entered from the operating section 36, the main monitor 19 displays the surrounding image successively along an entire circumference of the vehicle.

Like the above-described formation of the panorama image, the camera control section 43 adjusts the direction/angle of respective cameras 11–18 based on the instruction sent from the system control section 42 so as to optimize the resultant surrounding image.

Joint Image

Figure 9C:
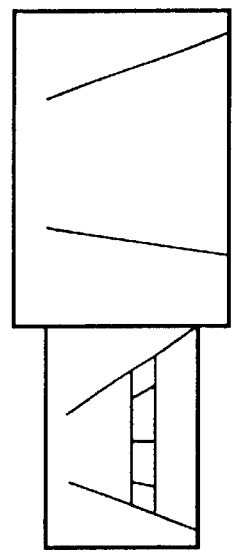
FIG. 9 is a view showing a joint image formed in accordance with the preferred embodiment of the present invention.

The joint image is a combination of two discontinuous images with a clear boundary thereof. For example, the driver may intend to turn the vehicle right in a slow speed condition. In such a case, the main monitor 19 displays a joint image consisting of the image taken by the left lateral camera 12 and the image taken by the right lateral camera 13 as shown in FIG. 9A.

In this manner, by displaying two images as a joint image, the camera direction of each displayed image can be grasped perceptually. Furthermore, the conditions seen from the vehicle in different directions can be recognized at a glance. This makes it possible to quickly obtain the circumferential information of the right and left sides of the road. Such information is usually unobtainable unless the driver swings his/her head in both right and left directions.

Figure 9B:
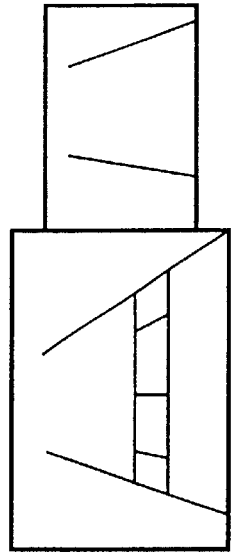
Figure 9A:
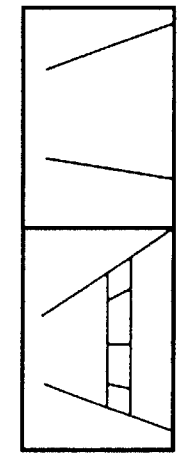

As shown in FIG. 9B, when the vehicle turns left, the main monitor 19 enlarges the image taken by the left lateral camera 12 compared with the image taken by the right lateral camera 13. On the contrary, as shown in FIG. 9C, when the vehicle turns right, the main monitor 19 enlarges the image taken by the right lateral camera 13 compared with the image taken by the left lateral camera 12. Thus, the driver can perceive the camera direction of each displayed image intuitionally in connection with the advancing direction of the vehicle. In this case, the image corresponding to the turning direction of the vehicle is enlarged because the driver should pay a greater caution to the turning direction of the vehicle. Thus, the driver can unconsciously find the image to be paid attention.

View Field Limited Image

Figure 7:
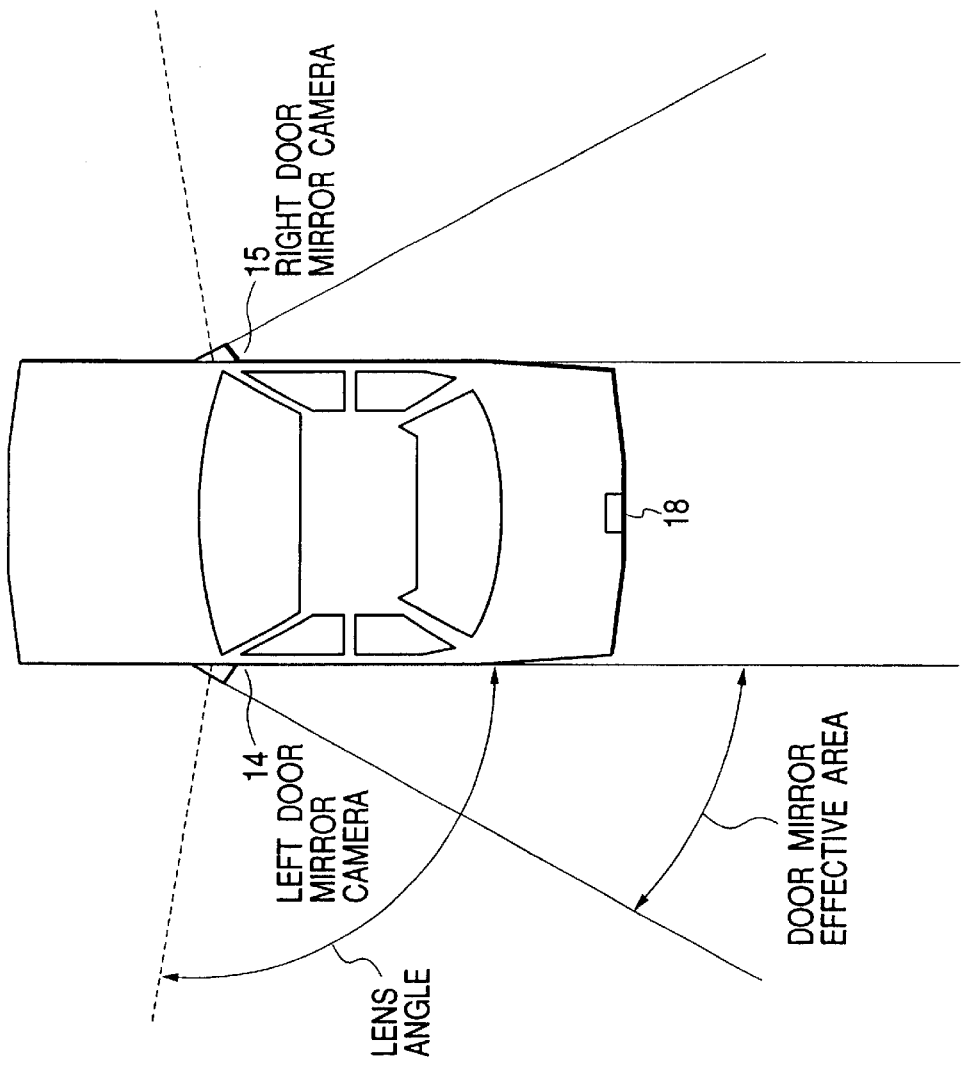
FIG. 7 is a plan view showing restriction of a view angle in each door mirror camera in accordance with the preferred embodiment of the present invention.

The view field limited image is a limited image taken by each of the door mirror camera 14 and 15, corresponding an image seen within a view angle of a door mirror when the vehicle is traveling, as shown in FIG. 7. To this end, the image processing section 47 abandons the image data outside a door mirror effective area from the image data of each of the door mirror cameras 14 and 15. Furthermore, the image processing section 47 enlarges the image data of the door mirror effective area to a full range of the screen. After being processed in this manner, the limited image taken by the left door mirror camera 14 is displayed on the left view monitor 20. Similarly, the limited image taken by the right door mirror camera 15 is displayed on the right view monitor 21.

The reason why the images of the door mirror cameras 14 and 15 are converted into the view field limited images is to effectively utilize the drive feeling acquired through driver's experiences. The driver can look the displayed images of the left view monitor 20 and the right view monitor 21 without any unusual feeling. In other words, the information obtained from the door mirror cameras 14 and 15 is substantially identical with the information obtained from the door mirrors. In actual driving operation, the image information outside the door mirror effective area is not so useful in the vehicle traveling condition. It is thus believed that clearly displaying the image of the door mirror effective area can provide a meaningful display.

Addition of Image Information

To raise driver's caution, or to aid driver's understanding the displayed image, a supplementary graphic pattern is added or part of the displayed image is modified. The following is practical examples of additional image information.

(a) Discriminating Approaching Object and Leaving Object

It is, for example, desirable that a red frame is put on an automotive vehicle approaching to the system vehicle while a green frame is put on a vehicle or other object leaving from the system vehicle.

To this end, the image processing section 47 detects a motion vector based on the frame-by-frame comparison on the image data taken by the front camera 11. The image processing section 47 obtains coordinate values of an object approaching to or leaving from the system vehicle. The image processing section 47 transmits the obtained coordinate values of the approaching or leaving object to the system control section 42. The system control section 42 instructs the character generator control section 45 to output a red or green frame and designates its position. The character generator control section 45 controls the character generator 46 to outputs a designated graphic pattern to a designated position. The graphic pattern produced from the character generator 46 is sent to the mixer 49. The mixer 49 mixes the received graphic pattern with the image processed by the image processing section 47. The main monitor 19 displays the resultant image including an approaching object encircled by the red frame and a leaving object encircled by the green frame.

It is however possible to emphasize the approaching object itself instead of putting the graphic pattern (i.e., red frame). For example, the approaching object itself can be emphasized by red and the leaving object can be emphasized by green.

Figure 10:
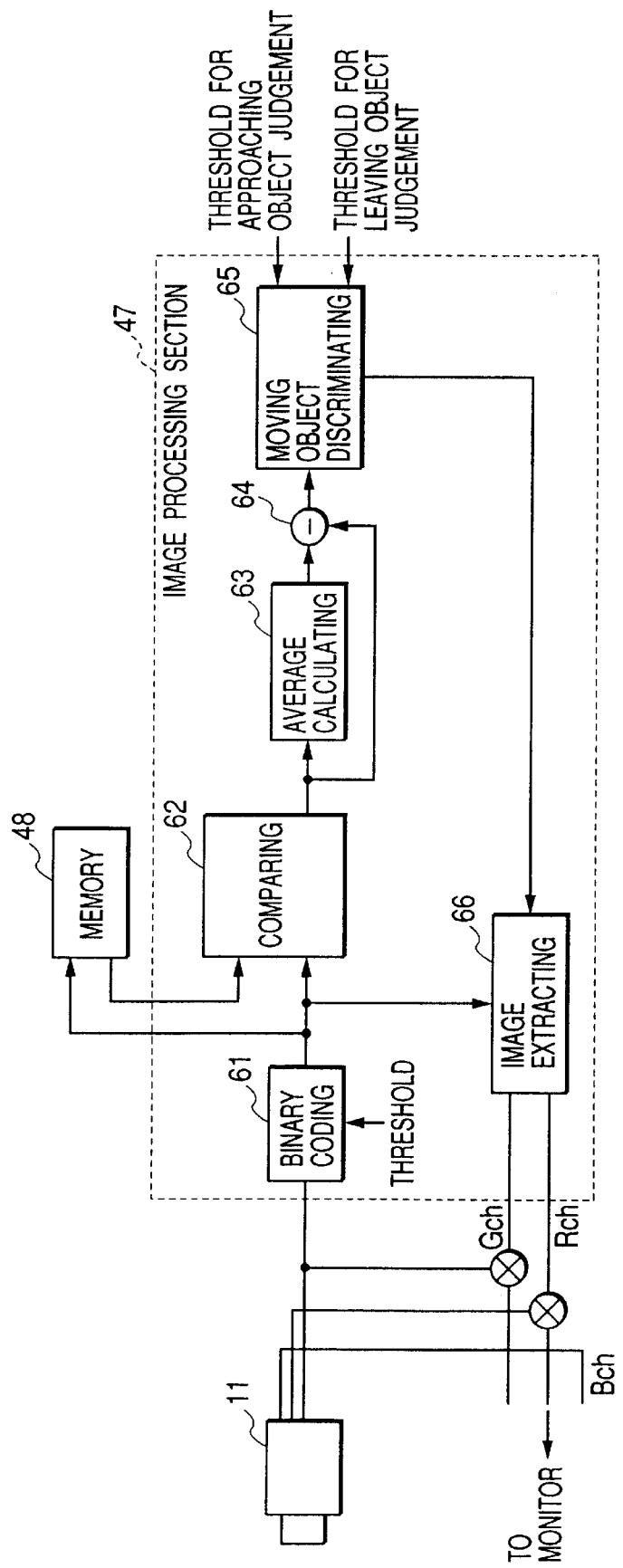
FIG. 10 is a block diagram showing the arrangement of an image processing section performing the image processing for discriminately displaying an approaching object and a leaving object based on the image of a camera outputting R, G and B signals in accordance with the preferred embodiment of the present invention.

FIG. 10 is a functional block diagram showing the arrangement of the image processing section 47 to realize such display. The image processing section 47 comprises a binary coding section 61 for converting an input image into a binary-coded image. A comparing section 62 compares the binary-coded image entered from the binary coding section

61 with a reference value stored in the memory 48. The reference value is a binary-coded image entered one field before. An average calculating section 63 calculates an average shift amount of image segments based on the comparison result of the comparing section 62. A subtracting section 64 calculates a difference between a shift amount of each image segment and the average shift amount. A moving object discriminating section 65 discriminates each moving object. An image extracting section 66 extracts the image of the detected moving object.

Hereinafter, the image processing is performed based on RGB video signals of the front camera 11. Of the RGB video signals outputted from the front camera 11, the video signal of G channel is entered into the binary coding section 61. The binary coding section 61 compares a signal level of each pixel with a predetermined threshold level, to produce a binary-coded image. The binary-coded image is sen to the memory 48 and the comparing section 62. The comparing section 62 reads the binary-coded image of the immediately previous field from the memory 48. The comparing section 62 compares the readout image with the binary-coded image received from the binary coding section 61, thereby detecting a shift amount of each pixel. The average calculating section 63 obtains an average of the shift amounts of each pixel detected by the comparing section 62. The average thus obtained is equivalent to a relative shift amount of a stationary object relative to the system vehicle.

The subtracting section 64 subtracts the average calculated by the average calculating section 63 from the shift amount of each pixel detected by the comparing section 62, thereby obtaining a difference of each pixel with respect to the average shift amount.

The moving object discriminating section 65 inputs two threshold levels, i.e., "approaching object judging threshold level" and "leaving object judging threshold level", which are determined beforehand. The moving object discriminating section 65 compares the average amount of each pixel with these threshold levels, thereby discriminating pixels displaying any approaching object as well as pixels displaying any leaving object. The discrimination information is sent to the image extracting section 66.

The image extracting section 66 extracts the image of the detected moving object, i.e., the approaching object and the leaving object, from the binary-coded image. The image of the extracted "approaching object" is outputted to the R channel, and the image of the extracted "leaving object" is outputted to the G channel.

The output image of the image extracting section 66 is superimposed on the image taken by the front camera 11. The composed image is displayed on the monitor. As a result, the displayed image of the approaching object is emphasized by red, while the displayed image of the leaving object is emphasized by green.

Figure 11:
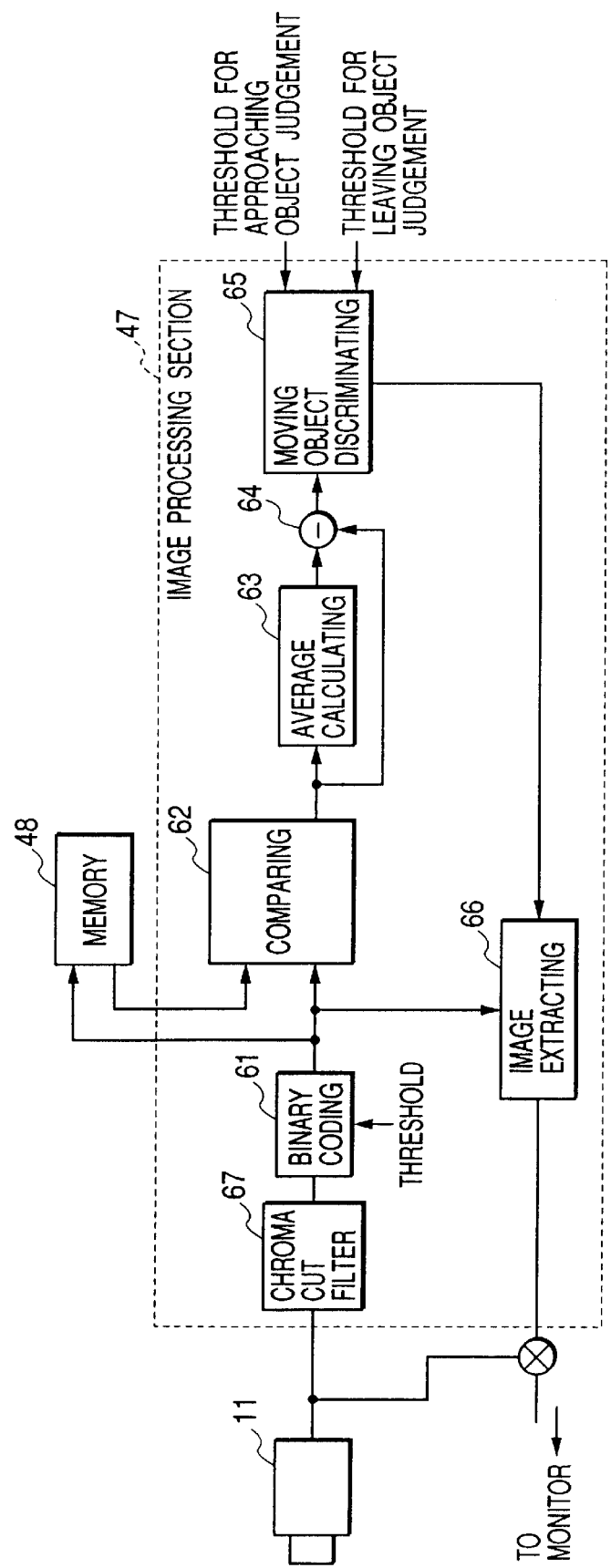
FIG. 11 is a block diagram showing the arrangement of an image processing section performing the image processing for discriminately displaying an approaching object and a leaving object based on the image of a camera outputting an NTSC signal in accordance with the preferred embodiment of the present invention.

FIG. 11 is another block diagram showing the arrangement of the image processing section 47 for processing a NTSC composite vide signal of the front camera 11. The image processing section 47 comprises a band elimination filter 67, such as a chroma cut filter, which cuts color signal components from the NTSC signal and extracts brightness signal components only. The binary coding section 61 produces a binary-coded image from the brightness signal received from the band elimination filter 67. The comparing section 62, the average calculating section 63, the subtracting section 64, and the moving object discriminating section 65 operate in the same manner as those disclosed in FIG. 10.

The image extracting section 66 receives the discrimination information from the moving object discriminating section 65, and extracts the images of the approaching object and the leaving object from the binary-coded image sent from the binary coding section 61. The extracted image of the approaching object is turned to red, and the image of the leaving object is turned to green.

The output signal of the image extracting section 66 is superimposed on the image signal produced from the camera 11. The composite image is displayed on the monitor. As a result, the displayed image of the approaching object is emphasized by red, while the displayed image of the leaving object is emphasized by green.

The image taken by the rear camera 18 provided at the rear end of the vehicle can be processed in the same manner as in the processing of the image of the front camera 11. This realizes a display of a vehicle approaching to the system vehicle from behind as well as a vehicle leaving from the system vehicle to far behind.

(b) Display of Traveling Track on Plan View Image

A traveling track of a system vehicle is superimposed on the plan view image displayed when the system vehicle moves backward. In this case, the image processing section 47 analyzes the image used for forming the plan view image and obtains graphic pattern data of a traveling track of the system vehicle as a projection on the road displayed on the plan view image. The image processing section 47 sends the obtained graphic pattern data of a traveling track to the system control section 42. The system control section 42 instructs the character generator control section 45 to display dots representing the traveling track of the system vehicle and designates their positions. Thus, the image of dots representing the traveling track of the system vehicle is superimposed on the plan view image.

Furthermore, the system control section 42 can calculate a predictive traveling track of the system vehicle based on the traveling track data obtained from the image processing section 47 and the steering angle signal 37. Thus, it is possible to superimpose the image of the predictive traveling tack on the plan view image via the character generator control section 45. Based on the predictive traveling track displayed on the monitor, the driver can easily make a judgement as to whether or not the system vehicle can smoothly and safely enter a target vacant space for parking.

Furthermore, by comparing the positional relationship between the predictive track based on the steering angle signal 37 and the target vacant space on the plan view image, it is possible to calculate an estimated position and an estimated angle of the system vehicle at the entry of the target vacant place. Thus, it becomes possible to teach the driver how to operate the steering wheel through the monitor display, or by using a voice guidance through the alarm generating section 44. In this case, it is preferable to guide the system vehicle to reach the center of the entry of the target vacant space at the right angle.

The system control section 42 displays these composite images in the following manner.

Figure 2:
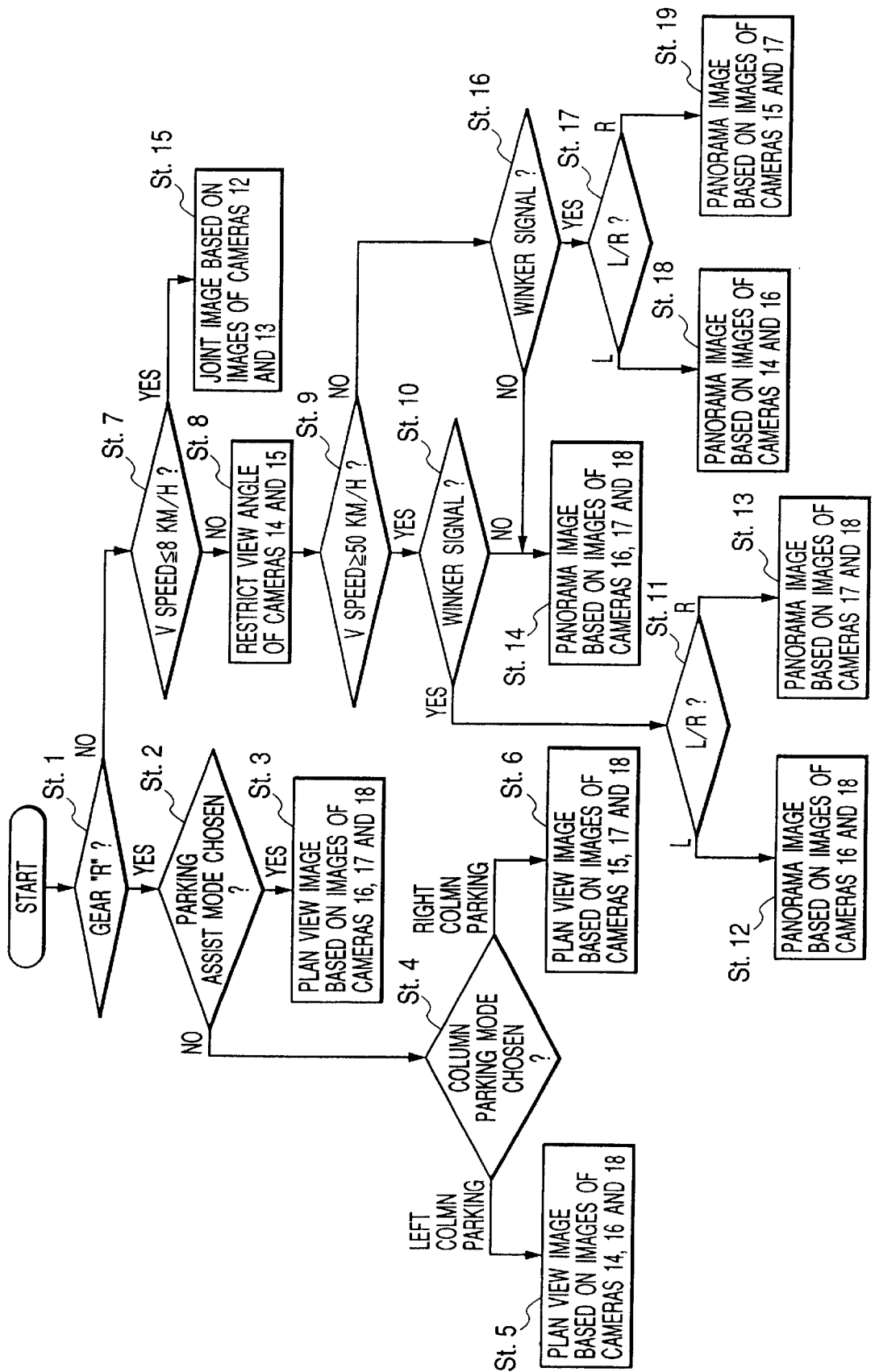
FIG. 2 is a flowchart showing an operation of the multi-functional on-vehicle camera system in accordance with the preferred embodiment of the present invention.

FIG. 2 is a flowchart showing the operation of the system control section 42.

In step 1, it is checked whether or not the gear position information 39 indicates that the present gear position is a "back" position.

When the present gear position is the "back" position (i.e., Yes in step 1), the control flow proceeds to a step 2.

In step 2, it is checked whether or not the driver selects a parking assist mode through the operating section 36.

When the driver selects the parking assist mode (i.e., Yes in step 2), the control flow proceeds to a step 3.

In step 3, the main monitor 19 displays a plan view image based on the images taken by the left pillar camera 16, the right pillar camera 17 and the rear camera 18.

When the driver does not select the parking assist mode (i.e., No in step 2), the control flow proceeds to a step 4.

In step 4, it is checked whether or not the driver selects a column parking assist mode through the operating section 36. In this case, the column parking is a parking mode for parking a vehicle along a left or right side of a road (or along a building etc.) where parked vehicles aligns vertically.

When the driver selects a left column parking assist mode, the control flow proceeds to a step 5.

In step 5, the main monitor 19 displays a plan view image based on the images taken by the left door camera 14, the left pillar camera 16, and the rear camera 18.

When the driver selects a right column parking assist mode, the control flow proceeds to a step 6.

In step 6, the main monitor 19 displays a plan view image based on the images taken by the right door camera 15, the right pillar camera 17, and the rear camera 18.

Figure 12:
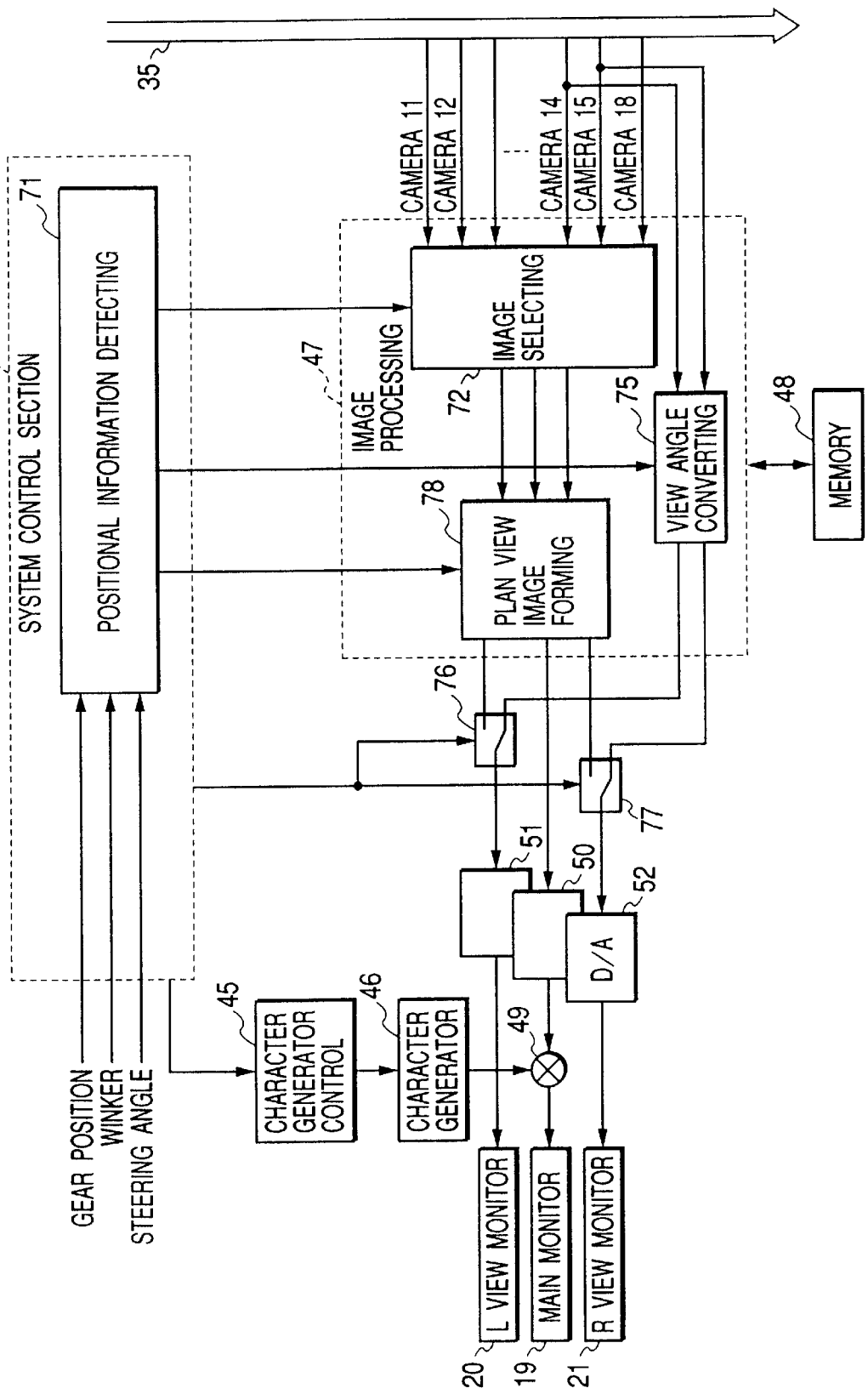
FIG. 12 is a block diagram showing a system arrangement for displaying a plan view image in accordance with the preferred embodiment of the present invention.

FIG. 12 is a block diagram showing a system arrangement for displaying a plan view image. The image processing section 47 comprises an image selecting section 72 for selecting the images of designated cameras, a plan view image forming section 78 for producing a plan view image based on the selected images, and a view angle converting section 75 for converting the view angles of the door mirror cameras 14 and 15. The system control section 42 comprises a positional information detecting section 71 for detecting vehicle conditions based on the gear position information, the winker information, and the steering angle information. When the gear is shifted to the "back" position, the positional information detecting section 71 of the system control section 42 instructs the plan view image forming section 78 of the image processing section 47 to produce a plan view image. Furthermore, the positional information detecting section 71 instructs the image selecting section 72 to select the images taken by cameras 16, 17 and 18 in response to the driver's choice of the parking assist mode. Furthermore, when the column parking assist mode is chosen, the winker information and the steering angle information are referred to select the images taken by cameras 14, 16 and 18 for the left column parking or select the images taken by cameras 15, 17 and 18 for the right column parking. Furthermore, the positional information detecting section 71 instructs the view angle converting section 75 to enlarge the portion corresponding to the door mirror effective area in the images taken by the door mirror cameras 14 and 15.

The enlarged image of the left door mirror camera 14, being processed in the view angle converting section 75, is displayed on the left view monitor 20 via a switching section 76. The enlarged image of the right door mirror camera 15, being processed in the view angle converting section 75, is displayed on the right view monitor 21 via a switching section 77. The plan view image produced from the plan view image forming section 78 is displayed on the main monitor 19.

Returning to the flowchart of FIG. 2, when the present gear position is not the "back" position (i.e., No in step 1), the control flow proceeds to a step 7.

In step 7, based on information of the vehicle speed signal 38, it is checked whether or not the vehicle speed is equal to or less than 8 km/h.

When the vehicle speed is equal to or less than 8 km/h (i.e., Yes in step 7), it is assumed that the driver in the system vehicle intends to carefully watch the front or the sides. Thus, the control flow proceeds to a step 15.

In step 15, the main monitor 19 displays the joint image based on the images taken by the left lateral camera 12 and the right lateral camera 13.

Figure 13:
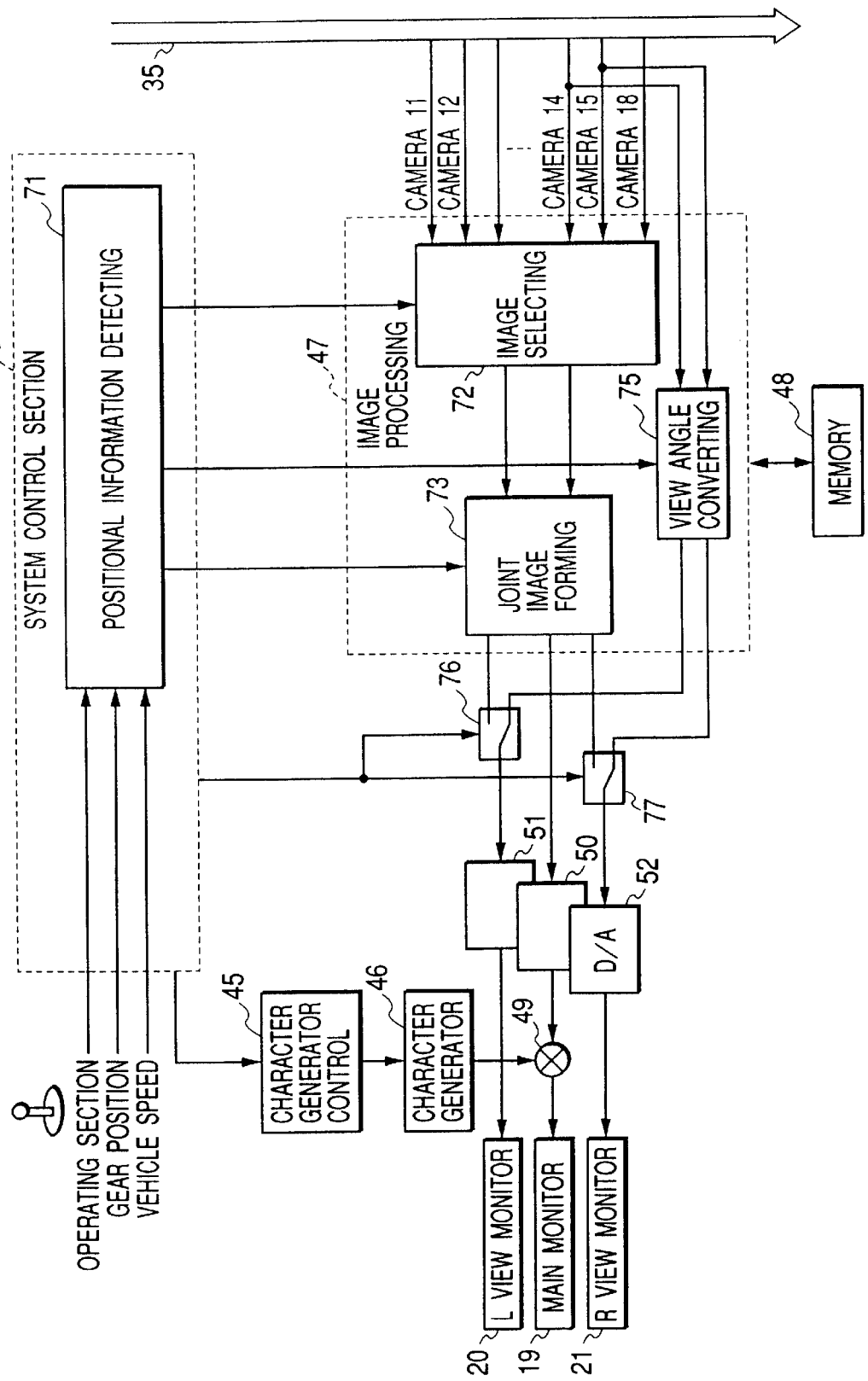
FIG. 13 is a block diagram showing a system arrangement for displaying a joint image in accordance with the preferred embodiment of the present invention.

FIG. 13 is a block diagram showing a system arrangement for displaying a joint image. The image processing section 47 comprises a joint image forming section 73 for producing a joint image in addition to the image selecting section 72 and the view angle converting section 75. When the vehicle speed is equal to or less than 8 km/h, the positional information detecting section 71 of the system control section 42 instructs the image selecting section 72 of the image processing section 47 to select the images taken by cameras 12 and 13. Furthermore, the positional information detecting section 71 instructs the joint image forming section 73 to produce a joint image consisting of the images taken by cameras 12 and 13. When the operating section inputs an instruction for displaying a joint image consisting of images having different display sizes, the positional information detecting section 71 informs the joint image forming section 73 of an image to be enlargedly displayed based on the gear position information. The joint image forming section 73 changes the display ratio of the images to be jointly displayed based on this instruction, and produces a modified joint image.

Furthermore, the positional information detecting section 71 of the system control section 42 instructs the view angle converting section 75 to directly display the images taken by the door mirror cameras 14 and 15 without changing their display sizes.

The wide angle image taken by the left door mirror camera 14 is displayed on the left view monitor 20 via the switching section 76. The wide angle image of the right door mirror camera 15 is displayed on the right view monitor 21 via the switching section 77. The joint image produced from the joint image forming section 73 is displayed on the main monitor 19.

Returning to the flowchart of FIG. 2, when the vehicle speed is larger than 8 km/h (i.e., No in step 7), the control flow proceeds to a step 8.

In step 8, the view angles of the door mirror cameras 14 and 15 are narrowed so as to be equalized to the door mirror effective area.

Then, the control flow proceeds to a step 9.

In step 9, it is checked whether or not the vehicle speed is equal to or larger than 50 km/h.

When the vehicle speed information indicates the speed equal to or larger than 50 km/h (i.e., Yes in step 9), the control flow proceeds to a step 10.

In step 10, based on the winker signal 40, it is checked whether or not the winker is turned on.

When the winker is turned on (i.e., Yes in step 10), it is assumed that the driver intends to perform lane changing. The control flow proceeds to step 11.

In step 11, it is checked whether the winker signal 40 indicates left or right. When the winker signal 40 indicates left, the control flow proceeds to a step 12.

In step 12, the main monitor 19 displays a panorama image based on the images taken by the left pillar camera 16 and the rear camera 18. When the winker signal 40 indicates right, the control flow proceeds to a step 13.

In step 13, the main monitor 19 displays a panorama image based on the images taken by the right pillar camera 17 and the rear camera 18.

When the winker is turned off (i.e., No in step 10), the control flow proceeds to a step 14.

In step 14, it is assumed that the system vehicle is in an ordinary traveling condition where the system vehicle substantially goes straight at a speed larger than 8 km/h. The main monitor 19 displays a panorama image based on the images taken by the left pillar camera 16, the rear camera 18, and the right pillar camera 17.

When the vehicle speed is less than 50 km/h (i.e., No in step 9), the control flow proceeds to a step 16.

In step 16, based on the winker signal 40, it is checked whether or not the winker is turned on.

When the winker is turned on (i.e., Yes in step 16), it is assumed that the driver intends to perform a turning or cornering operation of the system vehicle. In this case, to avoid any accident occurring at an inside of the turning or cornering vehicle, the control flow proceeds to a step 17.

In step 17, it is checked whether the winker signal 40 indicates left or right. When the winker signal 40 indicates left, the control flow proceeds to a step 18.

In step 18, the main monitor 19 displays a panorama image based on the images taken by the left door mirror camera 14 and the left pillar camera 16. When the winker signal 40 indicates right, the control flow proceeds to a step 19.

In step 13, the main monitor 19 displays a panorama image based on the images taken by the right door mirror camera 15 and the right pillar camera 17.

When the winker is turned off (i.e., Yes in step 16), the control flow proceeds to the step 14 in which the main monitor 19 displays a panorama image based on the images taken by the left pillar camera 16, the rear camera 18, and the right pillar camera 17.

Figure 14:
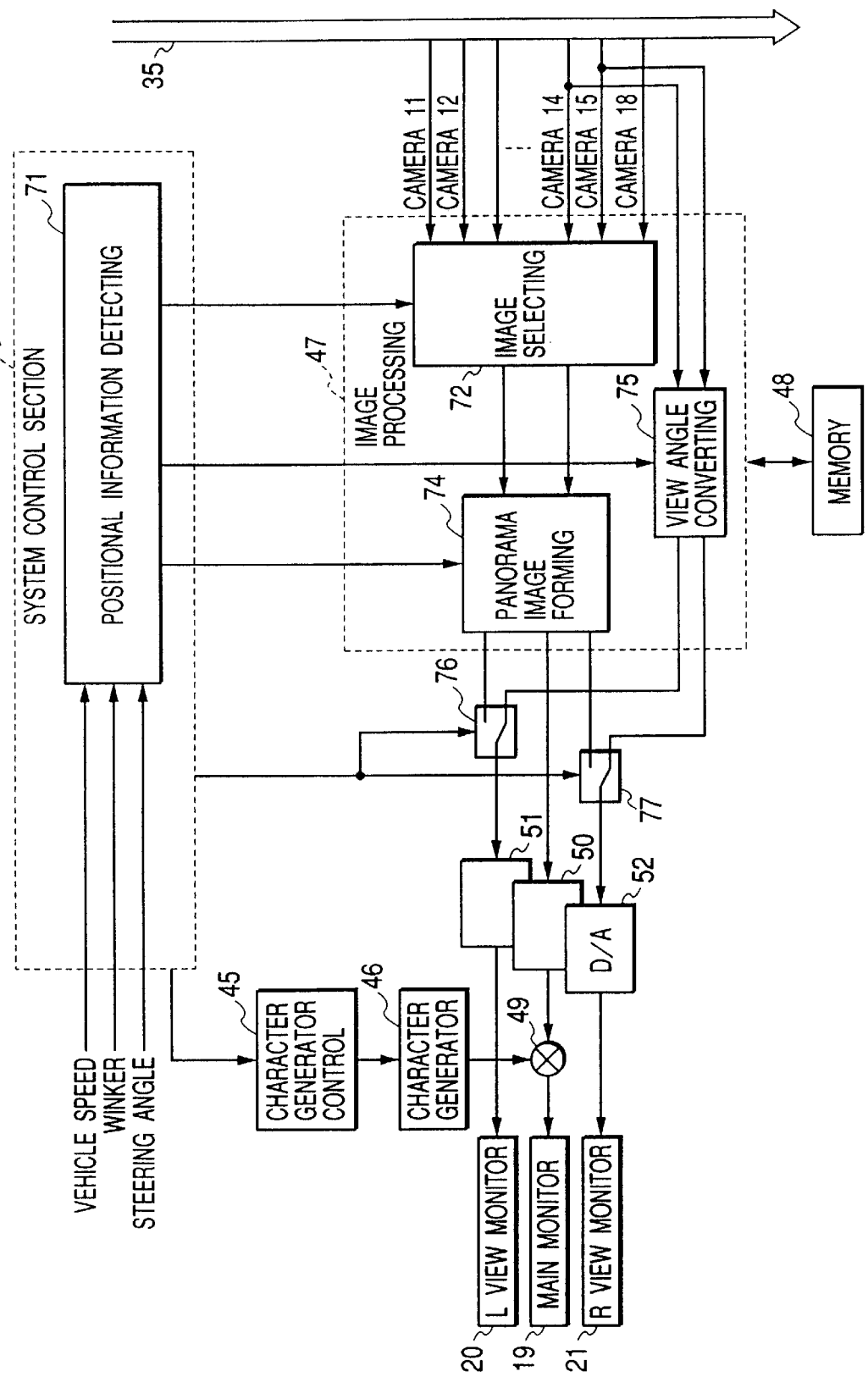
FIG. 14 is a block diagram showing a system arrangement for displaying a panorama image in accordance with the preferred embodiment of the present invention.

FIG. 14 is a block diagram showing a system arrangement for displaying a panorama image. The image processing section 47 comprises a panorama image forming section 74 for producing a panorama image in addition to the image selecting section 72 and the view angle converting section 75. When the vehicle speed information indicates the speed equal to or larger than 50 km/h and the winker information or the steering angle information indicates the left lane changing, the positional information detecting section 71 of the system control section 42 instructs the image selecting section 72 of the image processing section 47 to select the images taken by cameras 16 and 18. Similarly, when the winker information or the steering angle information indicates the right lane changing, the positional information detecting section 71 instructs the image selecting section 72 to select the images taken by cameras 17 and 18.

Furthermore, when the vehicle speed information indicates the speed in the range from 8 km/h to 50 km/h and the winker information or the steering angle information indicates the left turning or cornering operation, the positional information detecting section 71 instructs the image selecting section 72 to select the images taken by cameras 14 and 16. Similarly, when the winker information or the steering angle information indicates the right turning or cornering operation, the positional information detecting section 71 instructs the image selecting section 72 to select the images taken by cameras 15 and 17.

Moreover, when the vehicle speed information indicates the speed equal to or larger than 8 km/h and the winker information or the steering angle information indicates that the system vehicle is traveling straight, the positional information detecting section 71 instructs the image selecting section 72 to select the images taken by cameras 16, 17 and 18.

Furthermore, the positional information detecting section 71 instructs the panorama image forming section 74 to display a panorama image based on the images selected by the image selecting section 72.

Furthermore, the positional information detecting section 71 instructs the view angle converting section 75 of the image processing section 47 to enlarge the portion corresponding to the door mirror effective area in the images taken by the door mirror cameras 14 and 15.

The enlarged image of the left door mirror camera 14, being processed in the view angle converting section 75, is displayed on the left view monitor 20 via the switching section 76. The enlarged image of the right door mirror camera 15, being processed in the view angle converting section 75, is displayed on the right view monitor 21 via the switching section 77. The panorama image produced from the panorama image forming section 74 is displayed on the main monitor 19.

In this manner, this system makes it possible to adequately switch the display pattern of images in accordance with the steering angle signal 37, the vehicle speed signal 38, the gear position information 39, the winker signal 40 etc., thereby realizing the useful display of images to assist the safety driving.

Figure 15:
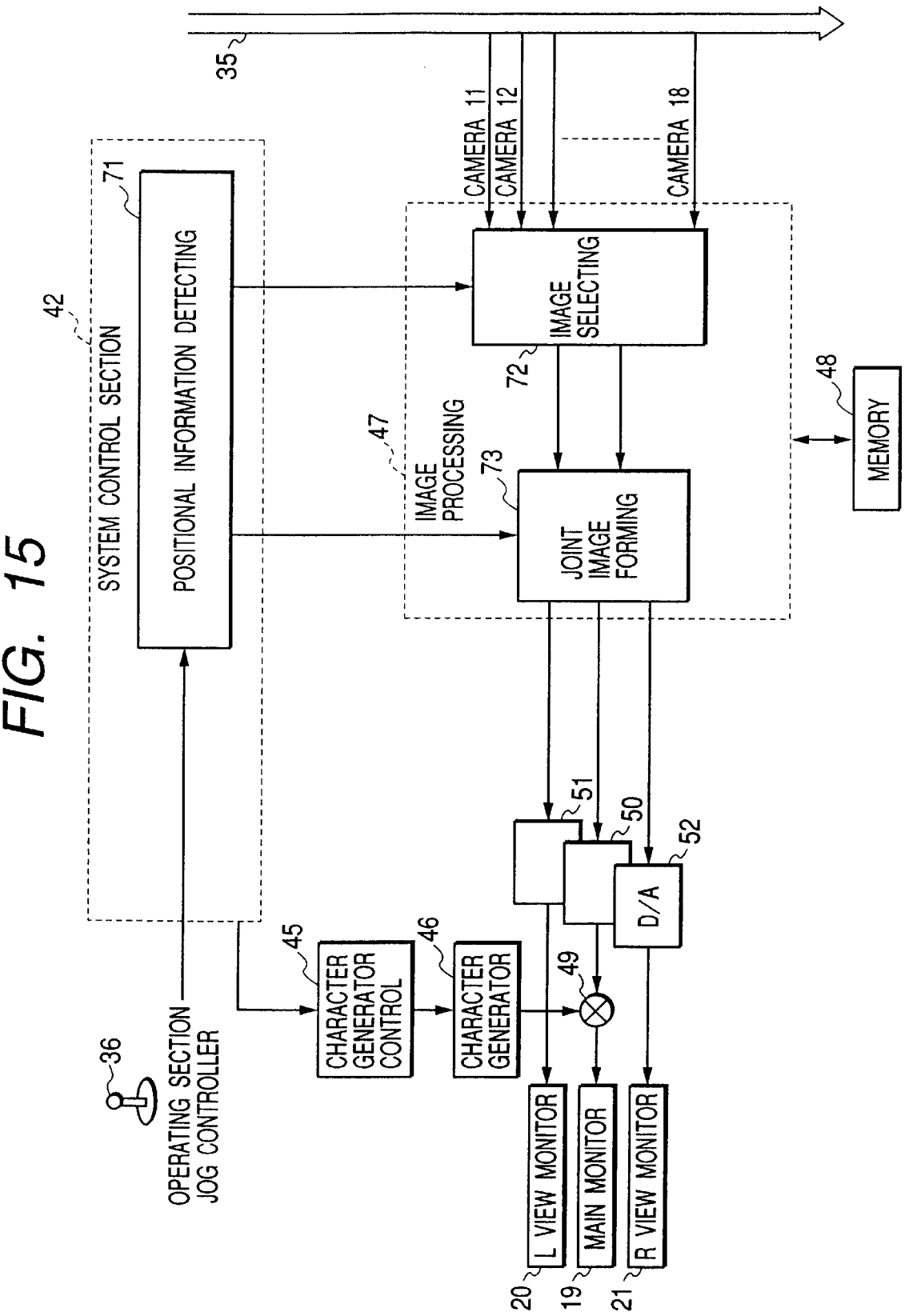
FIG. 15 is a block diagram showing a system arrangement for displaying a surrounding image in accordance with the preferred embodiment of the present invention.
Figure 16:
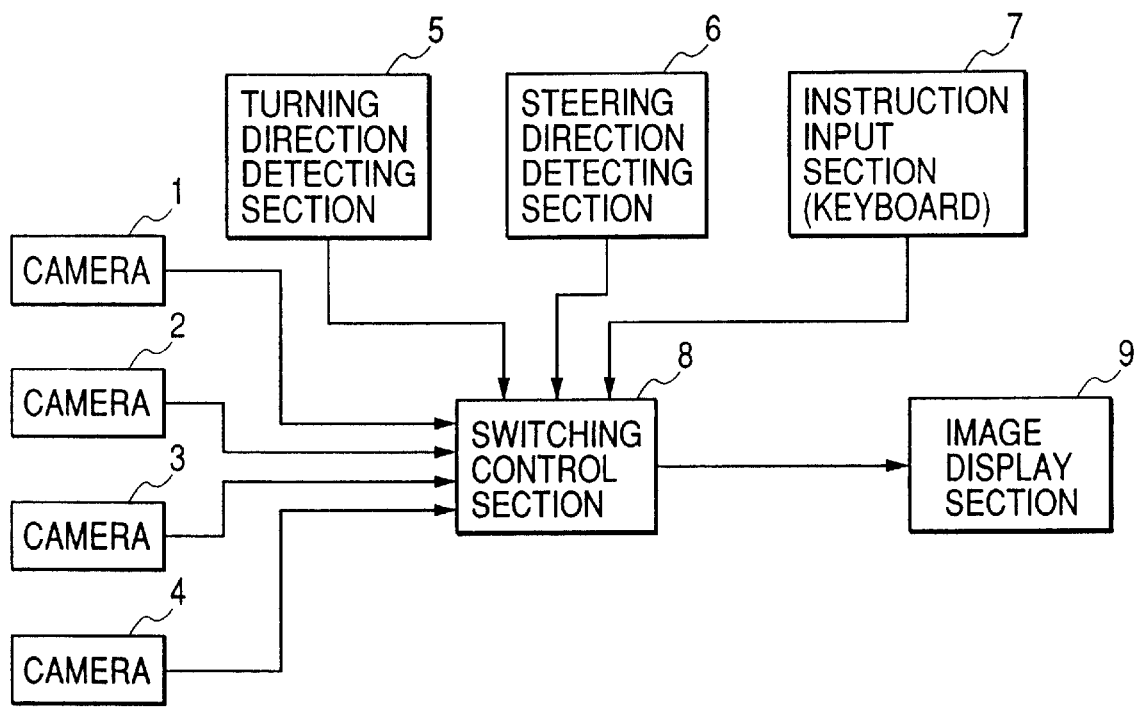
FIG. 16 is a block diagram showing a system arrangement of a conventional on-vehicle camera system.

FIG. 15 is a block diagram showing a system arrangement for displaying a surrounding image based on a driver's instruction. The positional information detecting section 71 of the system control section 42 instructs the image selecting section 72 of the image processing section 47 to select the image of each camera designated by the driver via a jog controller 36. Furthermore, the positional information detecting section 71 instructs the joint image forming section 73 to combine the images selected by the image selecting section 72. When the driver changes the direction of the jog controller 36, the image selecting section 72 changes the image to be displayed in response to the directional change of the jog controller 36. The joint image forming section 73 produces a composite image. The resultant composite image is displayed on the left view monitor 20, the right view monitor 21, and the main monitor 19.

When the system vehicle is stopped, a passenger may get off the vehicle incautiously and may be involved in an accident when other vehicle approaches from behind. To prevent such an accident, presence of any passenger in the system vehicle is checked by a sensor or a micro camera installed in a passenger compartment. When any passenger stays in the system vehicle even after the key of this vehicle is turned off, the left view monitor 20 and the right view monitor 21 continuously display the images taken by the door mirror cameras 14 and 15, respectively.

The above-described embodiment is based on the eight cameras mounted on the vehicle. However, it is possible to increase or decrease the total number of the cameras.

In the system of the present invention, the relationship between the vehicle conditions and the images to be displayed is not limited to the one disclosed in FIG. 2. Therefore, it is possible to variously change the relationship between the vehicle conditions and the images to be displayed.

As apparent from the foregoing explanation, according to the multi-functional on-vehicle camera system and the related image display method, it becomes possible to display the images for assisting the safety driving at an appropriate timing according to driving conditions. Furthermore, the present invention makes it possible to display the images in such a manner that the driver can easily grasp the circumferential conditions from the displayed image.

Displaying the images in accordance with the present invention makes it possible for the driver to pay caution to circumferential conditions without any burden. This helps the driver avoiding any accident or trouble.

This invention may be embodied in several forms without departing from the spirit of essential characteristics thereof. The present embodiment as described is therefore intended to be only illustrative and not restrictive, since the scope of the invention is defined by the appended claims rather than by the description preceding them. All changes that fall within the metes and bounds of the claims, or equivalents of such metes and bounds, are therefore intended to be embraced by the claims.

What is claimed is:

1. A multi-functional on-vehicle camera system comprising:
   a plurality of cameras mounted on a vehicle and a display unit for displaying at least one image from at least one of said cameras;
   image processing means connected to said plurality of cameras for processing images taken by said plurality of cameras;
   graphic superimposing means for superimposing a graphic pattern on said image processed by said image processing means, and
   system control means connected to said image processing means for selecting at least one image to be processed in said image processing means from the images taken by said plurality of cameras based on vehicle conditions, and for controlling a type of image processing performed in said image processing means,
   said system control means configured to control both a type and a position of said graphic pattern superimposed by said graphic superimposing means, wherein
   said image processing means produces a plan view image based on images from said plurality of cameras, so that said plan view image comprises an image of a vehicle seen from above.

2. The multi-functional on-vehicle camera system in accordance with claim 1, further comprising graphic superimposing means for superimposing a graphic pattern on said image processed by said image processing means,
   wherein said system control means controls both a type and a position of said graphic pattern superimposed by said graphic superimposing means.

3. The multi-functional on-vehicle camera system in accordance with claim 1, wherein said plurality of cameras includes at least two cameras selected from the group consisting of a rear camera for taking a rear view seen from the vehicle, right and left pillar cameras for taking right and left rear side views seen from the vehicle, right and left door mirror cameras for taking right and left door mirror views seen from the vehicle via right and left door mirrors, right and left lateral cameras for taking front side views seen from the vehicle, and a front camera for taking a front view seen from the vehicle.

4. The multi-functional on-vehicle camera system in accordance with claim 1, wherein said display unit comprises a right monitor for displaying an image taken by a right door mirror camera, and a left monitor for displaying an image taken by a left door mirror camera.

5. The multi-functional on-vehicle camera system in accordance with claim 1, wherein said image processing means produces a panorama image based on images taken by a plurality of cameras.

6. The multi-functional on-vehicle camera system in accordance with claim 1, wherein said image processing means produces a joint image by combining images taken by a plurality of cameras.

7. The multi-functional on-vehicle camera system in accordance with claim 1, wherein said image processing means is for producing a surrounding image representing a surrounding view seen from the vehicle by successively connecting images of all of said plurality of cameras mounted on the vehicle.

8. The multi-functional on-vehicle camera system in accordance with claim 1, wherein said image processing means is for producing an image formed by part of image data obtained from said plurality of cameras.

9. The multi-functional on-vehicle camera system in accordance with claim 1, wherein said image processing means is for producing an image including a moving object approaching or leaving with respect to the vehicle, said moving object emphasized by a predetermined color.

10. The multi-functional on-vehicle camera system in accordance with claim 1, wherein said system control means is for designating said camera image to be used in said image processing and is for designating a type of image processing performed in said image processing means based on at least one signal representing vehicle conditions selected from the group consisting of a steering angle signal, a vehicle speed signal, gear position information and winker information.

11. The multi-functional on-vehicle camera system in accordance with claim 1, wherein said graphic superimposing means is for superimposing a graphic pattern of a moving object approaching or leaving with respect to the vehicle.

12. An image display method of a multi-functional on-vehicle camera system comprising:
    a plurality of cameras mounted on a vehicle and a display unit for displaying at least one image from at least one of said cameras, said image display method comprising:
       processing at least one camera image selected from a plurality of images obtained from said plurality of cameras based on vehicle conditions, and
       displaying a processed camera image on said display unit, wherein
       said processed camera image comprises a plan view image including an image of the vehicle seen from above.

13. The image display method for a multi-functional on-vehicle camera system in accordance with claim 12, wherein
    said plurality of cameras include at least two cameras selected from the group consisting of a rear camera for taking a rear view seen from the vehicle, right and left pillar cameras for taking right and left rear side views seen from the vehicle, right and left door mirror cameras for taking right and left door mirror views seen from the vehicle via right and left door mirrors, right and left lateral cameras for taking said views seen from the vehicle, and a front camera for taking a front view seen from the vehicle, and
    images taken by said at least two cameras are processed in image processing means and displayed on said display unit.

14. The image display method for a multi-functional on-vehicle camera system in accordance with claim 13, wherein
    said plan view image is produced and displayed based on at least three images of said rear camera and said right and left pillar cameras when said vehicle moves backward.

15. The image display method for a multi-functional on-vehicle camera system in accordance with claim 14, wherein
    said plan view image is produced and displayed based on at least three images of said rear camera, said left pillar camera and said left door mirror camera when said vehicle moves backward for parking along a left side of a road.

16. The image display method for a multi-functional on-vehicle camera system in accordance with claim 13, wherein
said plan view image is produced and displayed based on at least three images of said rear camera, said right pillar camera and said right door mirror camera when said vehicle moves backward for parking along a right side of a road.

17. The image display method for a multi-functional on-vehicle camera system in accordance with claim 13, wherein
a panorama image is produced and displayed by combining at least two images of said left door camera and said left pillar camera when said vehicle turns left, thereby eliminating an accident occurring during a left turning or cornering operation.

18. The image display method for a multi-functional on-vehicle camera system in accordance with claim 13, wherein
a panorama image is produced and displayed by combining at least two images of said right door camera and said right pillar camera when said vehicle turns right, thereby eliminating an accident occurring during a right turning operation.

19. The image display method for a multi-functional on-vehicle camera system in accordance with claim 13, wherein
a panorama image is produced and displayed by combining at least two images of said left pillar camera and said rear camera when said vehicle performs lane changing to a left lane.

20. The image display method for a multi-functional on-vehicle camera system in accordance with claim 13, wherein
a panorama image is produced and displayed by combining at least two images of said right pillar camera and said rear camera when said vehicle performs lane changing to a right lane.

21. The image display method for a multi-functional on-vehicle camera system in accordance with claim 13, wherein said display unit includes a right monitor displaying an image taken by said right door mirror camera and a left monitor displaying an image taken by said left door mirror camera.

22. The image display method for a multi-functional on-vehicle camera system in accordance with claim 21, wherein each of said right and left monitors displays a limited image seen within a view angle of a corresponding door mirror when said vehicle is traveling.

23. The image display method for a multi-functional on-vehicle camera system in accordance with claim 13, wherein
a panorama image is produced and displayed by combining three images of said right and left pillar cameras and said rear camera when said vehicle is traveling ordinarily.

24. The image display method for a multi-functional on-vehicle camera system in accordance with claim 13, wherein
a joint image is produced and displayed by combining two images of said right and left lateral cameras when said vehicle is traveling slowly or stopped for confirmation of forward or side obstacles.

25. The image display method for a multi-functional on-vehicle camera system in accordance with claim 24, wherein
the image of said right lateral camera is enlarged when said vehicle turns right, and the image of said left lateral camera is enlarged when said vehicle turns left.

26. The image display method for a multi-functional on-vehicle camera system in accordance with claim 12, wherein
the image displayed on said display unit comprises a moving object approaching or leaving with respect to the vehicle, said object emphasized by a predetermined color.

27. The image display method for a multi-functional on-vehicle camera system in accordance with claim 12, wherein
a graphic pattern is superimposed on the displayed image, said graphic pattern representing a moving object approaching or leaving with respect to the vehicle.

28. The image display method for a multi-functional on-vehicle camera system in accordance with claim 21, wherein
the image taken by said door mirror camera is continuously displayed when any passenger is in the vehicle.

* * * * *